US008650568B2

(12) United States Patent
Behrendt et al.

(10) Patent No.: US 8,650,568 B2
(45) Date of Patent: Feb. 11, 2014

(54) METHOD AND SYSTEM FOR TRANSFORMING ORDERS FOR EXECUTING THEM IN STANDARD WORKFLOW ENGINES

(75) Inventors: Michael M. Behrendt, Randersacker (DE); Gerd Breiter, Wildberg (DE); Monika Illgner-Kurz, Herrenberg (DE); Marc Schwind, Holzgerlingen (DE); Johanna Ang'ani, Berlin (DE)

(73) Assignee: International Business Machines Corporation, Armonk, NY (US)

( * ) Notice: Subject to any disclaimer, the term of this patent is extended or adjusted under 35 U.S.C. 154(b) by 1993 days.

(21) Appl. No.: 11/428,717

(22) Filed: Jul. 5, 2006

(65) Prior Publication Data

US 2008/0021751 A1    Jan. 24, 2008

(51) Int. Cl.
*G06F 9/46*    (2006.01)

(52) U.S. Cl.
USPC .......................................................... 718/100

(58) Field of Classification Search
None
See application file for complete search history.

(56) References Cited

U.S. PATENT DOCUMENTS

| | | | |
|---|---|---|---|
| 5,568,605 A | 10/1996 | Clouston et al. | |
| 6,058,413 A * | 5/2000 | Flores et al. | 718/101 |
| 6,058,426 A | 5/2000 | Godwin et al. | |
| 6,112,243 A | 8/2000 | Downs et al. | |
| 6,868,448 B1 * | 3/2005 | Gupta et al. | 709/226 |
| 6,901,440 B1 | 5/2005 | Bimm et al. | |
| 7,167,821 B2 | 1/2007 | Hardwick et al. | |
| 7,644,410 B1 * | 1/2010 | Graupner et al. | 718/104 |
| 7,685,283 B2 | 3/2010 | Boyce, Jr. et al. | |
| 7,711,813 B1 * | 5/2010 | Yehuda et al. | 709/224 |
| 7,778,888 B2 | 8/2010 | Daur et al. | |
| 2002/0194251 A1 | 12/2002 | Richter et al. | |
| 2004/0064558 A1 | 4/2004 | Miyake | |
| 2004/0122983 A1 | 6/2004 | Speed et al. | |
| 2005/0131773 A1 | 6/2005 | Daur et al. | |
| 2005/0154735 A1 | 7/2005 | Breh et al. | |
| 2008/0052718 A1 | 2/2008 | Hundscheidt | |
| 2008/0201715 A1 | 8/2008 | Breiter et al. | |
| 2008/0319857 A1 | 12/2008 | Dobbins et al. | |

OTHER PUBLICATIONS

U.S. Appl. No. 11/428,725 Final Office Action—Feb. 10, 2011.
U.S. Appl. No. 11/428,725 Non Final Office Action Mailed Oct. 1, 2010.
U.S. Appl. No. 11/556,728 Non Final Office Action Mailed Dec. 9, 2010.

* cited by examiner

*Primary Examiner* — Gregory A Kessler
(74) *Attorney, Agent, or Firm* — Cantor Colburn LLP; William A. Kinnaman, Jr.

(57) ABSTRACT

The invention is based on Orders specifically developed for and processed by an Order Processing Environment for creation or modification of resource topologies. The Order Processing Environment is partly replaced by a combination of an Order Transformation Environment and standard Workflow Engines in order to execute the Order by standard Workflow Engines. The Order Transformation Environment needs to get two inputs. The first input is the resource topology which is retrieved by using the Relationship Registry of the Order Processing Environment. The second input is the Order. Orders are resource topology independent and include resource specific tasks without arranging those in a sequence. Tasks provide actions for creating and/or modifying resource topologies. The transformation is based on above two inputs resulting in a static standard based workflow. The static, standards-based workflow (e.g. BPEL-based) can then be executed by standards-based process/workflow engines. This enables users to exploit the flexibility of orders while still being able to leverage the broad set of tooling and runtime products available across the IT industry.

6 Claims, 11 Drawing Sheets

Figure 1:
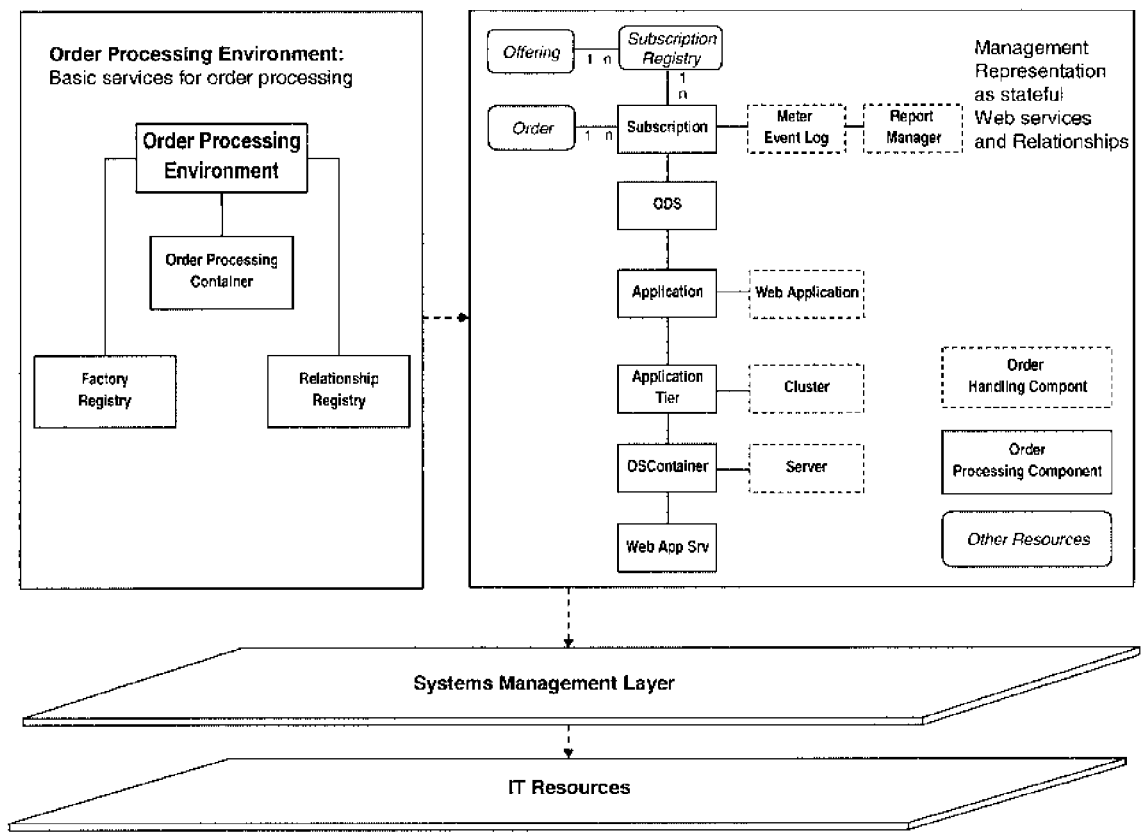

METHOD AND SYSTEM FOR TRANSFORMING ORDERS FOR EXECUTING THEM IN STANDARD WORKFLOW ENGINES

CROSS-REFERENCE TO RELATED APPLICATION

This application is related to the commonly owned, concurrently filed application, Ser. No. 11/428,725, entitled "METHOD AND SYSTEM FOR DYNAMICALLY CREATING AND MODIFYING RESOURCE TOPOLOGIES AND EXECUTING SYSTEMS MANAGEMENT FLOWS", incorporated herein by reference.

TECHNICAL FIELD OF THE INVENTION

The present invention relates to the field of workflow transformation, and in particular to a method and system for transforming orders for executing them in a standard Workflow Engines.
Motivation Today's data center management world is becoming more and more complex due to the growing complexity of multi-tier applications being run in a data center. Especially the instantiation of new applications instances and the modification of those instances has become very difficult.

There are approaches addressing the problem of growing complexity in terms of instantiating, modifying and configuring such applications. Due to their special problem domain, these approaches do not leverage standard, activity-based workflow languages. The present invention proposes a solution for transforming the descriptions being optimized for the instantiation, modification and configuration of resource graphs into standard-compliant, activity-based workflows. This allows leveraging the advantages of both worlds: The instantiation, modification and configuration of resource graphs can be described in a comfortable manner by using the description language being optimized for this domain. And for executing what is defined by this description it is possible to leverage the qualities provided by existing products being able to process standard workflows, which are for example implemented based on the Business Process Execution Language (BPEL).

BACKGROUND INFORMATION

This chapter will provide information on the background of this invention proposal. The first part of this chapter is concerned with the technical field of this invention proposal in general. After that the initial problem is described. Finally, the residual problem is addressed, which consequently provides the motivation for this invention proposal.

1. Technical Field

Today's IT infrastructures are composed of a large number of heterogeneous, distributed stateful resources. That is, complex multi-tier applications typically comprise or are hosted by several heterogeneous IT resources (e.g. servers, operating systems on those servers, databases, application server software, etc.). For each of those resources several resource-specific management functions are available for controlling the operation of a resource, i.e. for creating (provisioning), destroying (de-provisioning) and controlling the operation and configuration of a stateful resource. Resource management functions of a resource may also control other stateful resources—for example, a resource that acts as a resource manager may offer a service to create/provision a new instance of a certain other resource.

With regard to the notion of "Systems Management Flows" we also use the term "systems management tasks" for resource management functions (see the concurrently filed application cross-referenced above).

In order to perform systems management in the scope of a whole IT system (in contrast to single resources), an integration of single systems management tasks (for specific resources) into a systems-wide Systems Management Flow is necessary in order to treat a system as a whole and keep it in a consistent state.

The key to managing heterogeneous, distributed IT resources in an efficient and consistent way is to have common, standards-based interfaces to IT resources. In particular, the single systems management tasks providing management access to resources have to be accessible using common, standards-based interfaces. A common way for accessing distributed resources is using stateful Web services interfaces. This issue is addressed by several open Web Services standards (such as the Web Services Resource Framework (WS-RF), Web Services Distributed Management (WSDM), WS-Transfer, WS-Enumeration, etc.). Consequently, within the scope of this document it is assumed that systems management tasks for managing IT resources provide a stateful Web services interface and can thus be accessed by a management system in a uniform way.

The modeling of relationships between resources is another important aspect for managing heterogeneous distributed IT resources. For example, a resource may use or host another resource. Relationships between stateful resources are covered by open standards like WSDM.
Initial Problem EP 1636743A1 describes an approach for the proper instantiation, modification, and configuration of resource graphs representing complex multi-tier applications by using so-called order documents. Order documents are XML documents, which are tailored to the area of resource graph operations—with special focus on the comfortable modification of existing resource topologies. Although order documents have the advantage of comfortable means in the systems management area, there is the disadvantage that there is a special runtime environment needed in order to process these order documents. Since the processing of order documents has pretty much the character of traditional workflow processing, it would be desirable to process the semantics expressed by the order document in combination with the existing resource topology that is to be modified, in a standard workflow container (e.g. the IBM WebSphere Process Server being able to process Business Process Execution Language (BPEL) compliant process definitions). This would help to avoid the duplicate implementation of typical qualities of services for such runtime environments (e.g. security, error handling, scalability, etc.).

2. Prior Art

Traditionally, the provisioning of resources is supported by dedicated provisioning products. These software applications normally define their view of the data center within a database. This database is normally populated by some discovery mechanisms. Based on the information, which is stored in the database, another component of the provisioning product, a deployment engine, drives provisioning workflows in order to change the data center infrastructure as desired by the administrator. An example for such a provisioning product is IBM's Tivoli Provisioning Manager (TPM). Although TPM uses its own (proprietary) workflow description today, it could also be envisioned that there is some industry-standards based workflow description language used, like for example the Business Process Execution Language (BPEL).

Residual Problem

Each of the technologies described in the previous section have certain drawbacks, which will be elaborated in the following.

The traditional approach of "workflow-driven systems management" (as it is today for example available via IBM's Tivoli Provisioning Manager) has the drawback that the used workflows are very inflexible, i.e. each time the desired deployment topology changes (e.g. for a multi-tier application from single-node deployment to distributed deployment), the workflows have to be adapted as well. This is due to the fact that the workflows assume a certain resource topology underneath. Once this resource topology changes slightly, the workflows break. As already indicated in the previous chapter, this kind of drawback is not limited to a specific product. This kind of drawback applies to all approaches being based on the concept of performing systems management actions by using plain activity-based workflow technology.

The concept of orders overcomes the aforementioned drawback of the strong dependency of the description for systems management actions on underlying resource topology. This is achieved by combining the knowledge about the information required by resources with the knowledge about the actual resource topology. The drawback of this approach is in turn that it is not possible to leverage existing products supporting traditional workflows. That means, it would be required to build the kind of tooling that is today for example available in the BPEL area (Process Modeling Tools, Debugging Tools, etc.) again for order documents. Furthermore, it would be required a special runtime infrastructure for order documents with all the qualities of service, which are today already available in standard process engines (e.g. IBM WebSphere Process Server). These qualities of service refer to security, scalability, error recovery, transactional behavior, etc.

So the residual problem in this area is the problem of needing a combination of the flexibility of order documents and the robustness and industry support of standardized workflow languages. Therefore, this patent describes an approach for transforming order documents, which can be regarded as very dynamic interpreter-based workflows into static, activity-based processes, like for example BPEL processes. This allows being very flexible in terms of the description of systems management actions while using enterprise-level tooling and runtime support.

OBJECTS OF THE INVENTION

It is an object of this invention to provide a method and system for transforming orders for executing them in standard workflow engines.

SUMMARY OF THE INVENTION

The invention is based on Orders specifically developed for and processed by an Order Processing Environment for creation or modification of resource topologies. The Order Processing Environment is partly replaced by a combination of an Order Transformation Environment and standard Workflow Engines in order to execute the Order by standard Workflow Engines.

The Order Transformation Environment needs to get two inputs.

The first input is the resource topology which is retrieved by using the Relationship Registry of the Order Processing Environment.

The second input is the Order. Orders are resource topology independent and include resource specific tasks without arranging those in a sequence. Tasks provide actions for creating and/or modifying resource topologies.

The transformation is based on above two inputs resulting in a static standard based workflow. The static, standards-based workflow (e.g. BPEL-based) can then be executed by standards-based process/workflow engines. This enables users to exploit the flexibility of orders while still being able to leverage the broad set of tooling and runtime products available across the IT industry.

DESCRIPTIONS OF DRAWINGS

Figure 2:
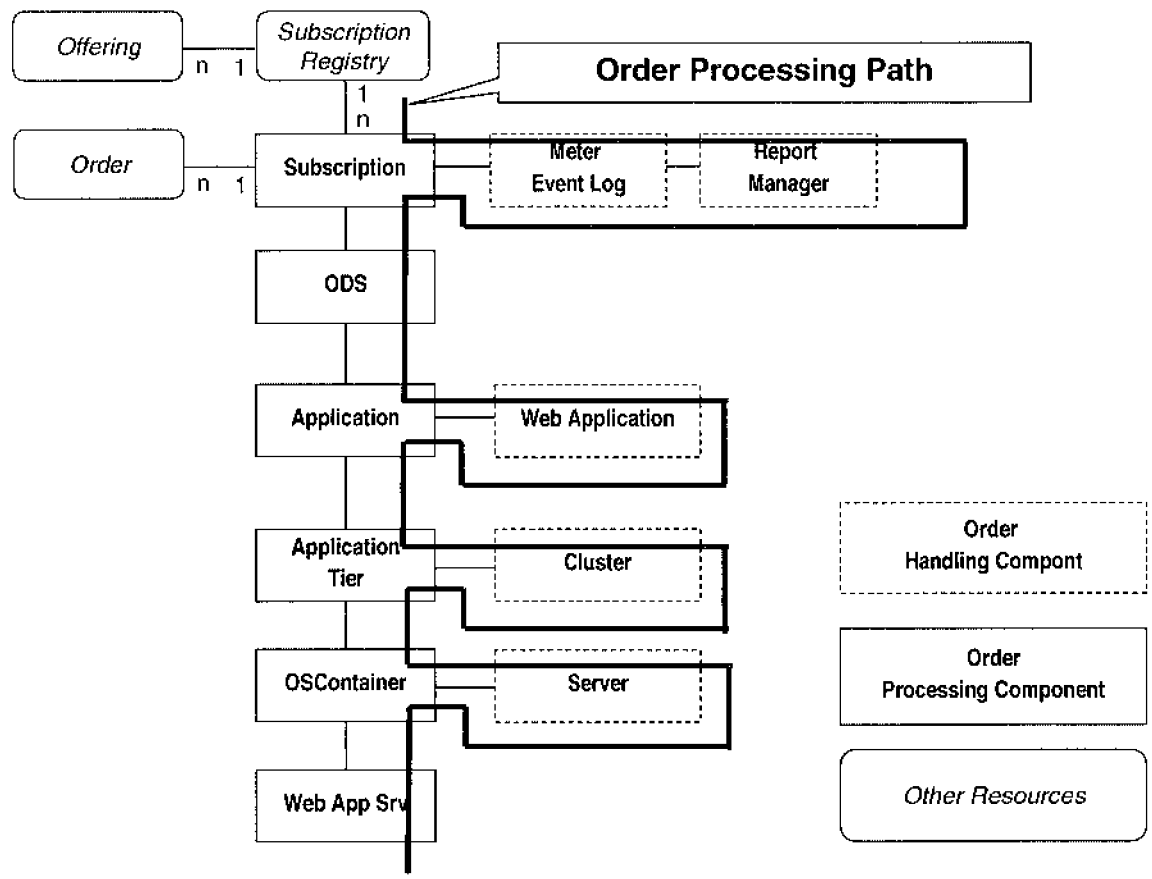
Figure 3:
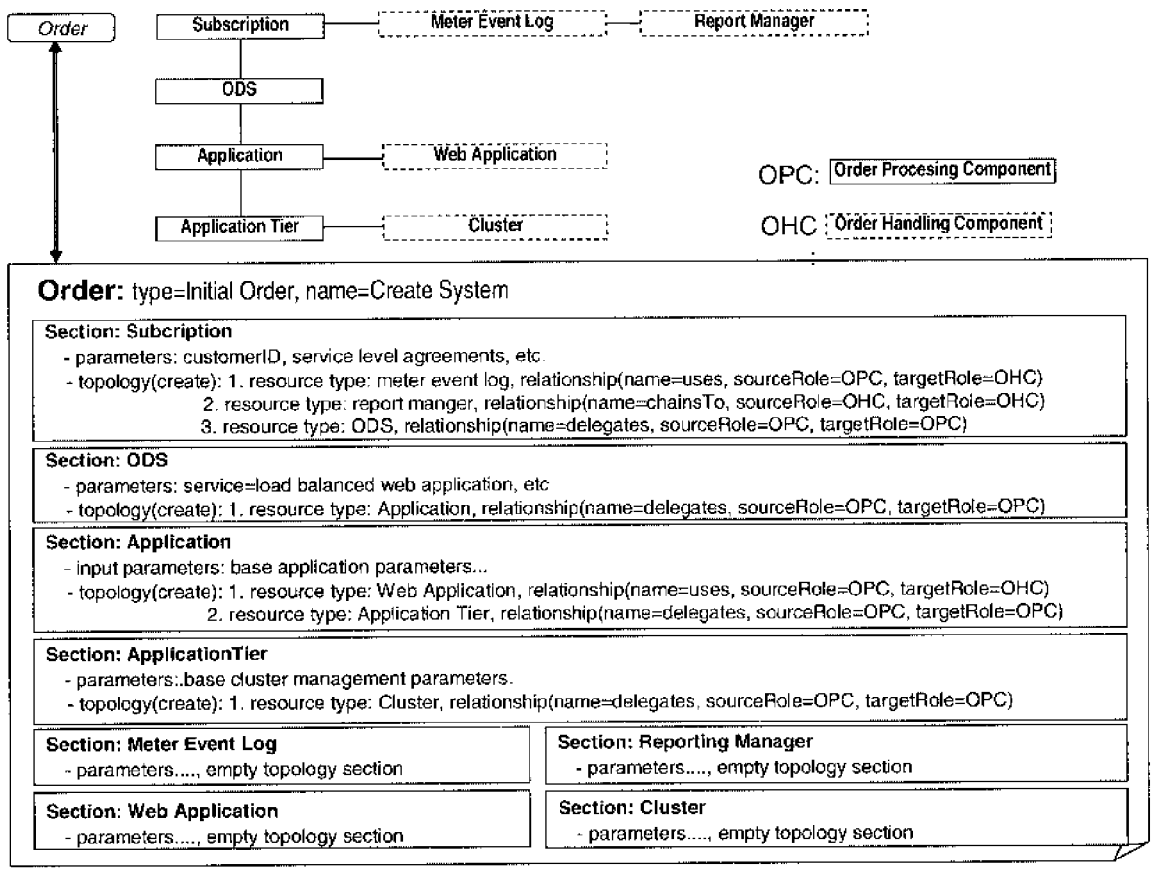
Figure 4:
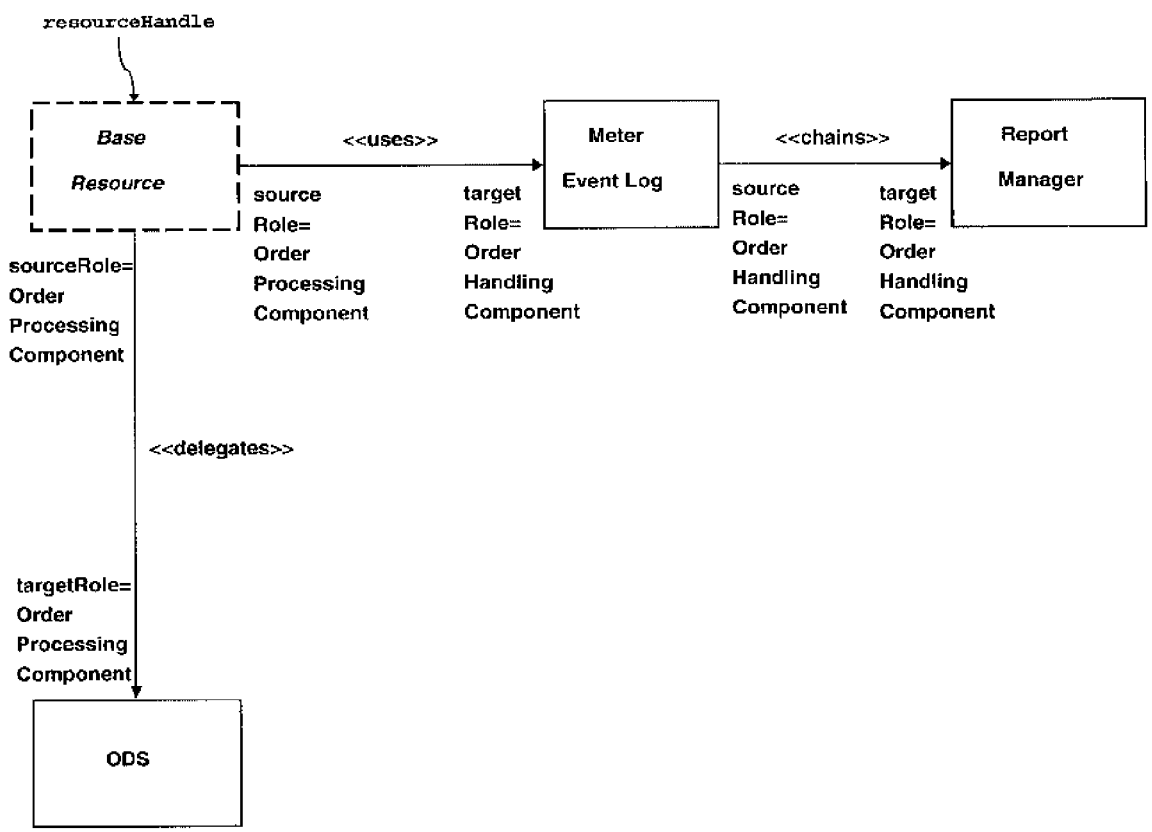
Figure 5:
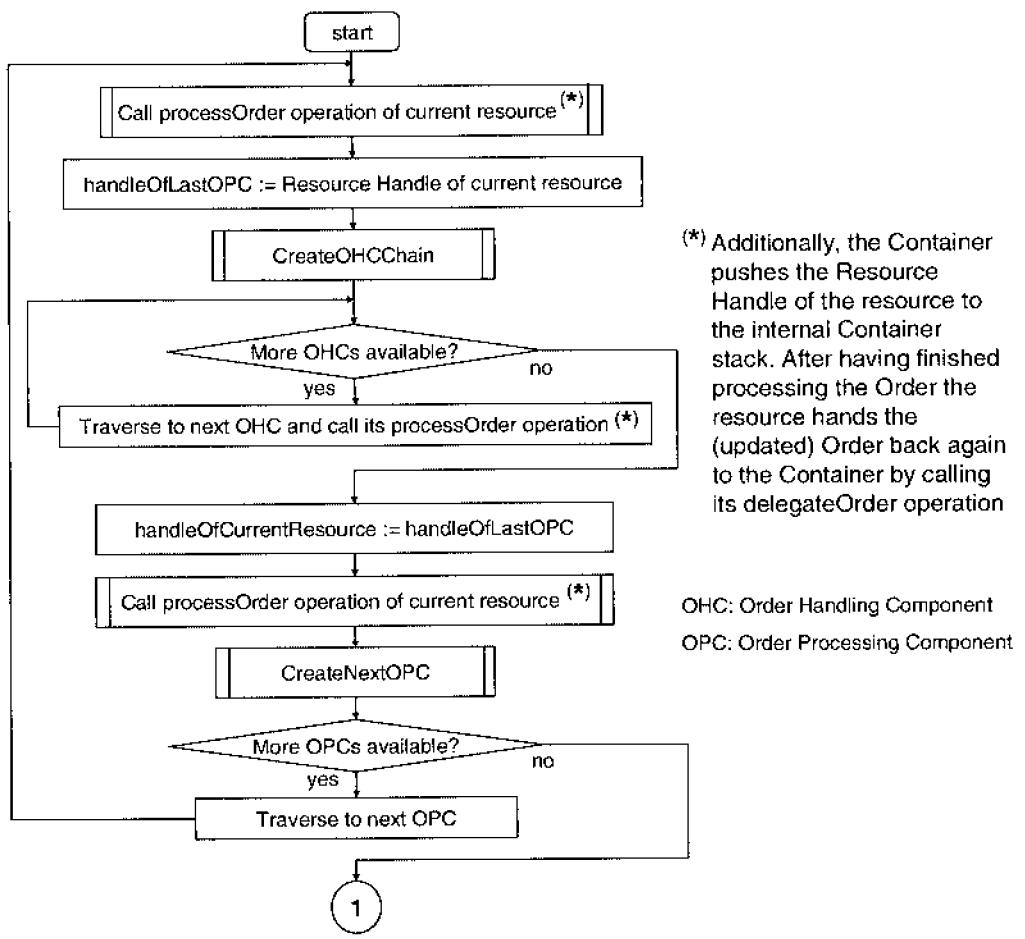
Figure 6:
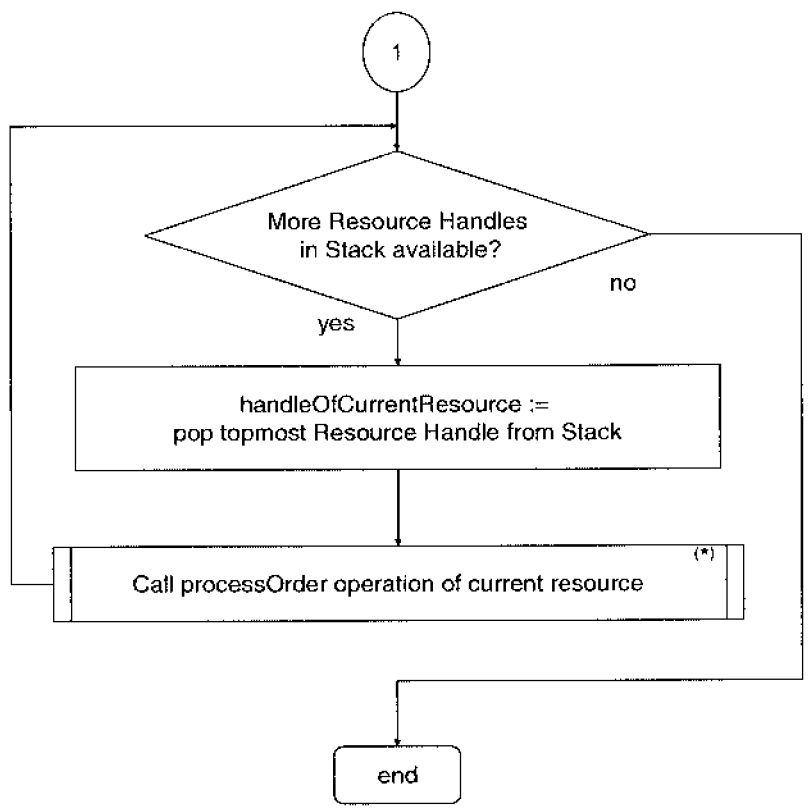
Figure 7:
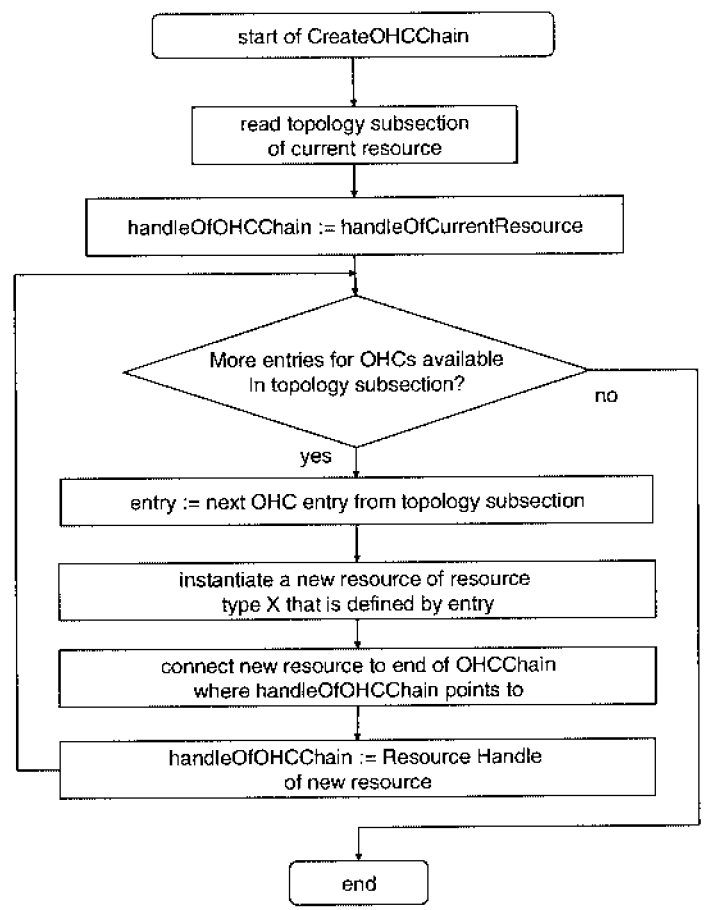
Figure 8:
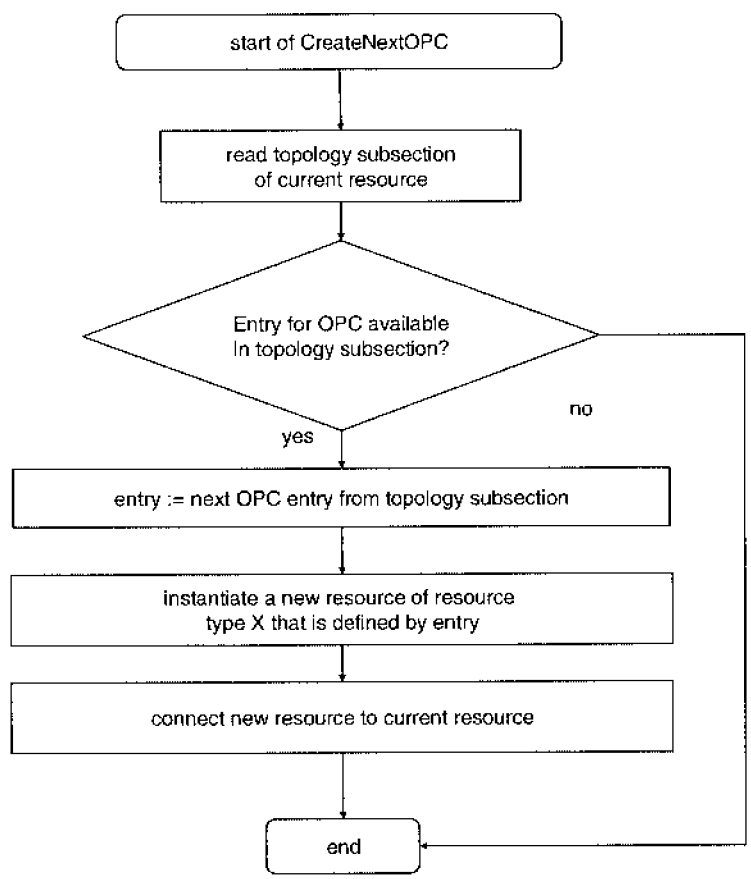
Figure 9:
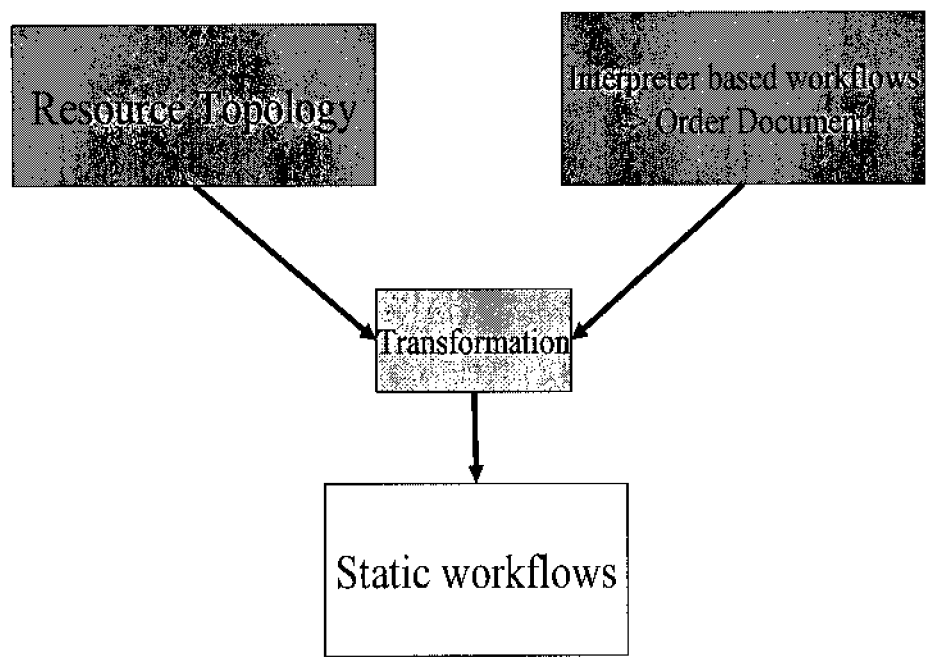
Figure 10:
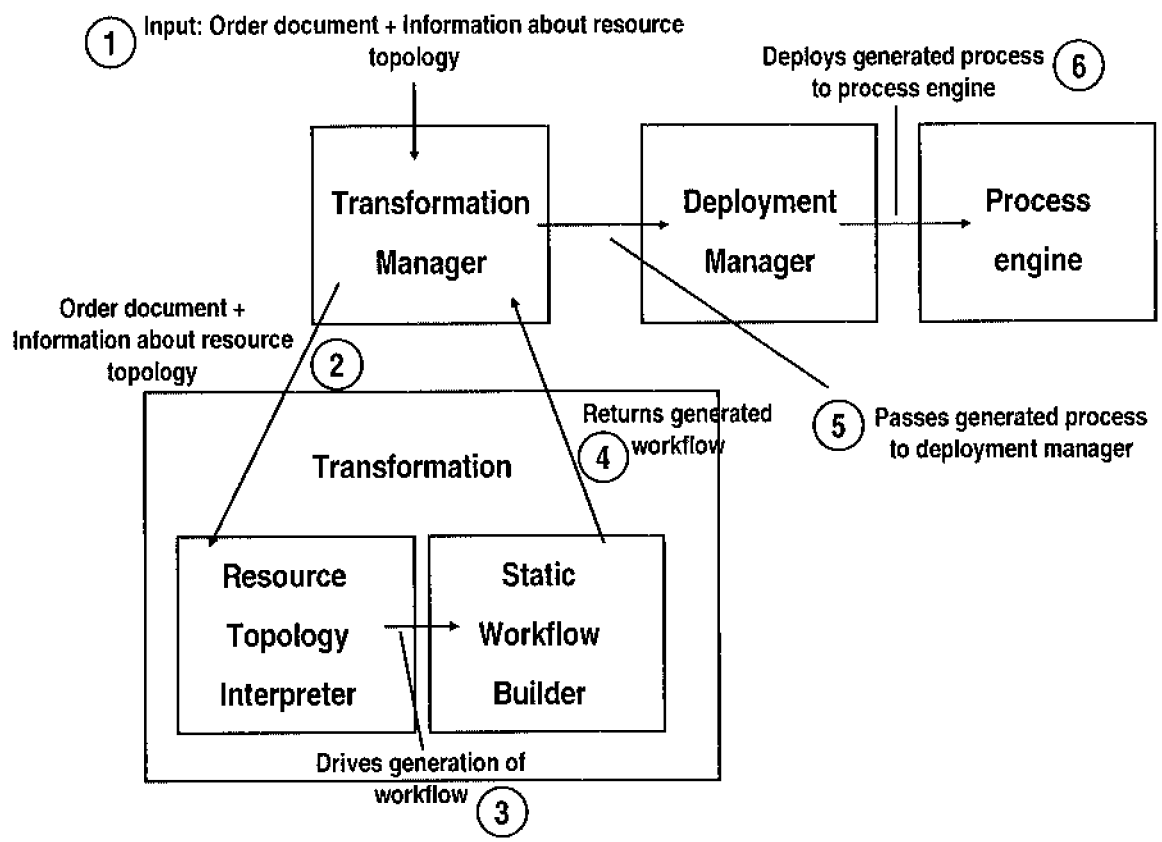
Figure 11:
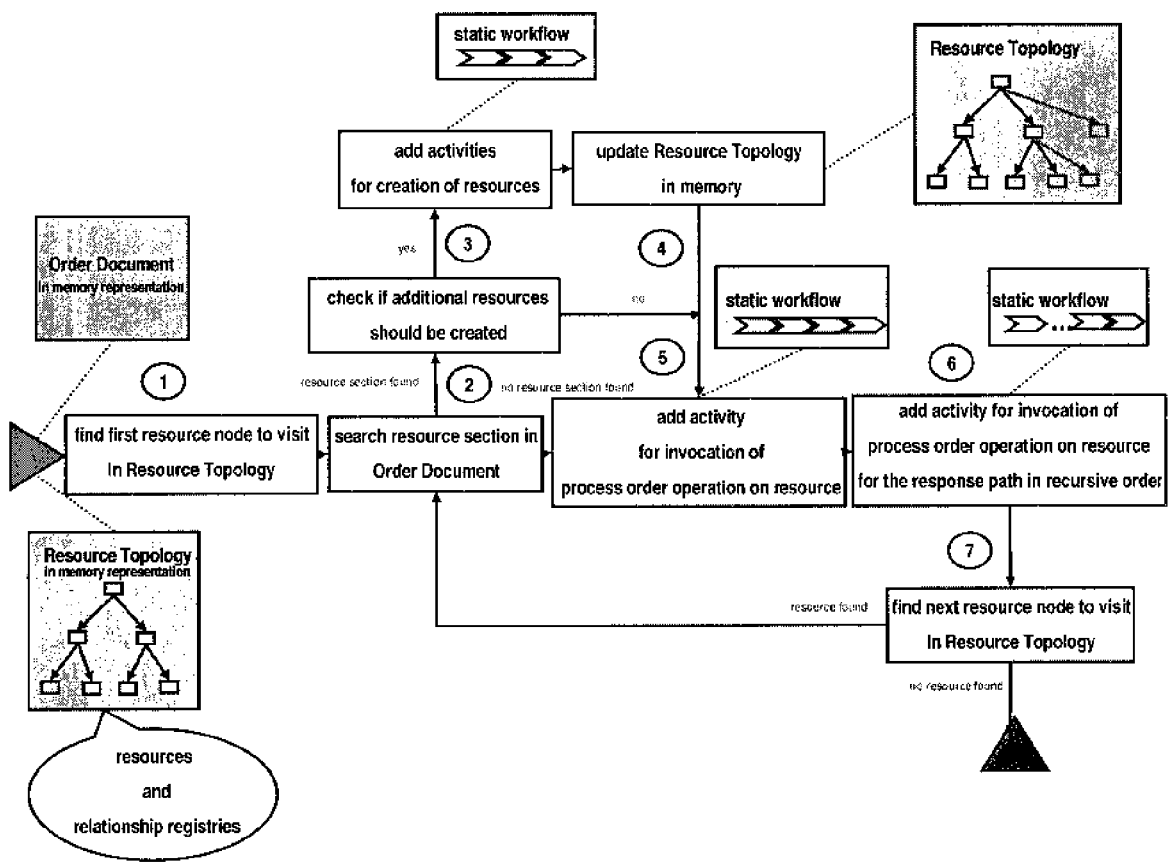

FIG. 1 shows the Order Processing Environment on which the present invention is based, FIG. 2 shows the Order Processing Path within the Order Processing Environment, FIG. 3 shows the structure of an initial Order, FIG. 4 shows an example of a Topology Subsection, FIG. 5 shows an Order Processing Loop of Container—Request Path, FIG. 6 shows an Order Processing Loop of Container—Response Path, FIG. 7 shows a Subroutine CreateOHC chain, FIG. 8 shows a Subroutine CreateNextOPC, FIG. 9 shows the basic structure of the present invention, FIG. 10 shows the basic components of the present invention, and FIG. 11 shows the inventive method of the present invention.

DETAILED DESCRIPTION OF THE INVENTION

The present invention is based on orders which are processed within an Order Processing Environment which includes Order Processing Container, Relationship Registry, and Factory Registry (see detailed description on page 8 to 10).

At first the Order Processing Environment is described in more detail in Section 1 and then the Order Transformation Environment for which patent protection will be sought is described in section 2.

Section 1

The order definition is strongly focused on improving and simplifying the process of instantiating, modifying and configuring resource graphs in general (whereas they are of course mainly targeted to be used in the systems management field). This goal is achieved by combining the knowledge about the infrastructure, which will be modified by the order with the information that is conveyed by the order itself. This is in significant contrast to traditional approaches, where the flow of activities of a system management flow is directly defined by the hard-coded sequence of activities within the flow.

Resources in the Context of Order Processing

In the following description of the order concept the term "asynchronous operation" is used. In the context of this invention an asynchronous operation is defined as an operation that immediately returns to the caller of the operation without a result. The called operation is executed later at same point in time. In this sense, implementation examples for asynchronous operations are one-way web service operations, or operations that are called via messages which are delivered by a messaging system like JMS (Java Messaging System).

Resources that take part in Order Processing implement the asynchronous operation processOrder. The only parameter of this operation is the Order that is handed over to the resource by the Container. When being called by processOrder the resource interprets the input parameters of its associated Task section in the Order and executes the Task (refer to section "Structure and Semantics of Orders" for more details regarding Order structure). A Task can perform any operation. Typically, the resource calls components of the Systems Management Layer in order to fulfill the Task. There is no specification for the interfaces of the components in the Systems Management Layer. The resource has to cover the interfacing by itself, the Order Processing Environment does not provide any support for this issue. While executing the Task, the resource may write results to its Task section in the order. Finally, the resource calls the Container of the Order Processing Environment by its asynchronous operation delegateOrder and hands over the (updated) Order back again.

There are two roles defined for resources in the context of Order Processing: role Order Processing Component and role Order Handling Component. Order Processing Components represent the base nodes of the Resource Topology. Each resource with role Order Processing Component has a related chain of resources with role Order Handling Component. Instead of using the terms "resources with role Order Handling Component" and "resources with role Order Processing Component" we simplify our wording and use "Order Handling Components" and "Order Processing Components", respectively, in the following text. The Order Handling Component chain may also be empty for a Order Processing Component. For example, resource Subscription in FIG. 1 has an associated chain of two Order Handling Components (MeterEventLog and ReportManager), resource ODS has no associated Order Handling Components (in other words, the associated chain of Order Handling components is empty for ODS). The Container calls each Order Processing Component before and after all Order Handling Components that are contained in its associated chain. Furthermore, after all resources have been called, the Container reverses Order Processing and calls all resources again that it has called before in reverse order. As a consequence, each Order Processing Component is called four times by the Container by its processOrder operation, while each Order Handling Component resource is called twice by the Container by its processOrder operation. The example in FIG. 2 shall help to clarify the way how Orders are processed. In the example, Order Processing starts at the Subscription resource. The fact that resources get the Order from the Container and hand over the Order back to the Container again after the execution of their associated Task is not shown FIG. 2. Instead, the sequence of the involved resources that process the order is depicted: the path starts with the Subscription resource that gets the Order handed over from the Container (i.e. the Container calls the processOrder operation of Subscription), processes the task and returns the Order back again (by calling the delegateOrder operation of the Container). The MeterEventLog resource is the second resource in the path (section "Order Processing Container" describes how the Container determines the resources along the processing path). The Container hands over the Order to the MeterEventLog, which in turn processes and then returns the Order back again to the Container. Then the path continues with the ReportManager resource. The Subscription resource is the next resource in the path. This is the second time that the Subscription resource is called by its processOrder operation. Each Order Processing Component is called before and after its related Order Handling Component chain by the Container by its processOrder operation. In contrast to this, each Order Handling Component in the chain is only called once by the Container. The processing path then continues with the ODS resource. Although the Order Handling Component chain of ODS is empty, ODS is called twice (before and after the empty Order Handling Component chain). The path continues with Application, WebApplication, etc.. Finally, the path ends up with the WebAppSry resource. The Container detects the end of the path if it cannot find any related successor resource that it could hand over the Order (see "Order Processing Container" how the Container determines the resources along the processing path). At this point in time the Container reverses the order processing path and calls each resource again that it has called before in reverse order. In the example of FIG. 2, the Container starts the reverse path (which is also called Response Path in contrast to the Request Path that has been discussed so far) with the WebAppSry resource. The WebAppSry resource is called twice (before and after its empty Order Handling Component chain). Then the reverse path continues with the OSContainer resource, followed by the Server resource, the OSContainer resource again, the Application Tier resource, etc. The reverse path finally ends up with the Subscription resource. This also ends Order Processing for that Order.

As a result (as mentioned earlier), each Order Processing Component is called four times by the Container by its processOrder operation, while each Order Handling Component is called twice. As a consequence each Order Processing Component can subdivide the execution of its Task into four parts, while each Order Handling Component can subdivide the execution of its Task into two parts. It depends on the purpose of the Order and the individual Task how this subdivision must be done and it is up to the resource developer to make these decisions. Furthermore, all resources must keep an internal state in order to detect how often they have been called by its processOrder operation. There are no hints they get from the Order Processing Environment.

Finally, each resource must implement the operation destroy. This operation is called by the Container when it removes a resource from the Resource Topology. This is the last call the Container performs towards the resource. Then the Container removes the relationship to that resource from the Relationship Registry. From that point on the resource is treated by the Order Processing Environment as being removed and thus not existent when being called with destroy the resource should remove all of its instance data.

Relations Between Resources

Relations between resources are stored in the Relationship Registry component of the Order Processing Environment (refer to section "Relationship Registry" for more details). As the term "Relation" indicates, a relation connects two resources with each other in order to reflect a relationship between these resources with regard to the Resource Topology. Each edge in the Resource Topology graph is represented by a relation between two resources.

For the purpose of the present invention, each relation comprises of five attributes:

1. sourceHandle (a Resource Handle pointing to the first resource)
2. targetHandle (a Resource Handle pointing to the second resource)

3. sourceRole (role of the first resource)
4. targetRole (role of the second resource)
5. relationName (optional, can be used as name or stereotype for the relation).

In the context of this invention a Resource Handle is a pointer to a resource—either a direct reference to a resource or an indirect reference to a resource that must be resolved into a direct reference (the notion of direct and indirect references is, for example, mentioned in the Global Grid Forum Open Grid Service Infrastructure (OGSI)—direct references are called Grid Service References (GSR), and indirect references are named Grid Service Handles (GSH)). Another example for direct references are End Point References as defined in the WS-Addressing standard. In the context of this invention we assume that Resource Handles are unique for a resource instance so that they can be directly compared for the sake of simplicity of this description. But this does not restrict the generality of this invention. Comparisons, meaning the decision whether two Resource Handles point to the same resource instance, can be enhanced in a straightforward way since stateful resources have a unique resourceId: query the resources for the resourceId where the two Resource Handles point to. Then compare these two values.

The attributes sourceRole and targetRole define the roles of the related resources. There are two roles defined: Order Handling Component (H) and Order Processing Component (P). Valid combinations of (sourceRole, targetRole) include (P, P), (P, H) and (H, H). The combination (H, P) is invalid.

Relations are interpreted as directed connections between two resources. The direction of a relation expresses a parent-child relationship between two resources with regard to the underlying Resource Topology. The sourceRole attribute expresses the parent role of the resource that is defined by attribute sourceHandle, while the targetRole attribute expresses the child role of the resource defined by attribute targetHandle. The attribute relationName is optional and has no further purpose in the context of this patent.

Structure and Semantics of Orders

The Order is a document (e.g., XML) which includes a number of tasks for each involved resource without arranging those tasks in a sequence. The Task sequence is derived from the Resource Topology as described in section "Order Processing Container". This differentiates Orders from workflow definitions used by standard workflow engines.

There are three types of Orders:
1. Initial Orders
2. Modification Orders
3. Termination Orders Initial Orders contain Tasks for building up an initial Resource Topology. Modification Orders can be processed on Resource Topologies that have been initialized by an Initial Order (e.g., a Modification Order includes Tasks for provisioning a new server to the existing system). A Termination Order is the last Order that can be applied to a Resource Topology. The purpose of this Order is to terminate all management actions, to clean up any storage that keeps state information which is not required anymore, and then remove all resources of a given Resource Topology.

In addition to the Order type, each Order has an Order name which identifies the specific Order. The resources interpret the Order type and the Order name in addition to their input parameters for deriving the Task that has to be performed. Each resource has an internal list of known Orders, identified by the Order type and the Order name. If a resource is called with an unknown Order then the resource shall perform no action and return the Order immediately to the Container.

FIG. 3 shows an example of an Initial Order with the Order name "Create System". The Order is intended to build up a base Resource Topology as depicted at the top of the figure. The Order contains eight sections, one for each resource. A resource identifies its associated section in the Order by the section name which is the resource type identifier of the resource (e.g., section Subscription refers to the Subscription resource). Each section in the Order contains two subsections: the parameters subsection and the topology subsection. Both subsections can be empty.

A topology subsection defines a set of relationships and resources to be created or removed from the current Resource Topology starting from the current resource. The topology subsection includes:
1. A hint for the Container whether the mentioned relations and resources are to be created or removed by the values "create" and "remove", respectively.
2. A list of entries, one for each resource and relation that are to be created or removed. Each entry includes: the resource type of the resource that is to be created or removed, and definitions for the relation attributes "name", "sourceRole", and "targetRole".

All relations and resource definitions in a topology subsection of a resource X are interpreted relative to resource X. In the case that the resources and relations of the topology subsection shall be added to the Resource Topology, the topology subsection has following semantics: all listed Order Handling Components are appended via relations to the Order Handling Component chain of resource X in the same sequence as they appear in the list of entries which is mentioned in point 2. above. The listed Order Processing Component (if any) is directly connected to resource X via a relation. The mentioned relations are added to the Relationship Registry according to the definitions of the relation attributes in the topology subsection entries. The role of the new resources that are listed in the topology subsection entries is derived from the definition of the corresponding relation attribute targetRole since the listed new resources are always the targets of the relations that are defined in topology subsections.

FIG. 3 shows an example of an Initial Order that contains a section for resource Subscription. The related topology subsection for Subcription is repeated here:

Topology.create: (meaning the topology below is to be created and connected to Subscription)
1. resource type: meter event log, relationship (name=uses, sourceRole=OPC, targetRole=OHC)
2. resource type: report manger, relationship (name=chainsTo, sourceRole=OHC, targetRole=OHC)
3. resource type: ODS, relationship (name=delegates, sourceRole=OPC, targetRole=OPC) with OHC and OPC being short forms for Order Handling Component and Order Processing Component, respectively.

The semantics of the mentioned topology subsection example is that three new resources (Meter Event Log, Report Manager, and ODS) are to be created and added to the Subscription resource in the following way:
1. From point 1. in the list above can be derived that Meter Event Log shall act as an Order Handling Component since the relationship targetRole attribute is OHC. So the Meter Event Log will be appended to the Order Handling Component chain of the Subcription resource by a relation with name=uses, sourceRole=Order Processing, and targetRole=Order Handling Component, sourceHandle=Resource Handle of Subscription, and targetHandle=Resource Handle of Meter Event Log (see also FIG. 4). Meter Event Log is the first resource in the Order Handling Component chain of Subscription.

2. From point 2. in the list above can be derived that Report Manager shall act as an Order Handling Component since the relationship targetRole attribute is OHC. So the Report Manager will be appended to the Order Handling Component chain of the Subcription resource by a relation with name=uses, sourceRole=Order Processing, and targetRole=Order Handling Component. Since Meter Event Log has been listed before Report Manager, the Report Manager will appended to the Meter Event Log, in other words: sourceHandle will point to Meter Event Log, and targetHandle will point to Report Manager (see also FIG. 4).

3. From 3. in the list above can be derived that ODS shall act as an Order Processing Component since the relationship targetRole attribute is OPC. So ODS will be connected directly to the Subscription via a relation with name=delegates, sourceRole=Order Processing, and targetRole=Order Processing Component, sourceHandle=Resource Handle of Subscription, and targetHandle=Resource Handle of ODS (see also FIG. 4).

Topology subsections that refer to removal of resources and relations are indicated by the hint "remove". The Container identifies the existing resources and relations that are to be removed by interpreting the topology subsections in much the same way as described above for creating new resources and relations. Topology sections for removal may have less information for identifying relations and resources as long as the definition of each entry leads to a unique result. Otherwise, the Container flags an error and refuses to apply the topology subsection to the current Resource Topology. Error handling is not part of this invention and is not discussed any further.

Relationship Registry

The Relationship Registry is part of the Order Processing Environment and stores relations between resources. The semantics and structure of relations is described in section "Relations between Resources".

Section "Container" describes how relations are used for the derivation of correct sequences for Tasks that are contained in Orders—in other words, how relations are used for the step-wise derivation of Systems Management Flows from the underlying Resource Topology while processing an Order.

In the following the interface of the Relationship Registry is summarized.

addRelationship(relation) Adds a new relation to its internal storage.

removeRelationships(resourceHandle) Removes all relations with relation.sourceHandle=resourceHandle or relation.targetHandle=resourceHandle from its internal storage. In the context of this invention we assume that Resource Handles can be compared directly as discussed in section "Relations between Resources".

findRelatedTargetsByRole(startHandle, targetRole):
ResourceHandle[ ] Retrieves all relations that are contained in the internal storage with relation.sourceHandle=startHandle and relation.targetRole=targetRole and returns the value of relation.targetHandle for all relations that have been found as an array of Resource Handles. The length of the array may be zero if no relations can be found for the requested criteria.

Factory Registry

The Factory Registry is part of the Order Processing Environment and stores for each resource type one Resource Handle that points to a resource factory for that resource type. In the context of this invention it is assumed that each resource factory provides a create operation without parameters which instantiates a new resource instance for the given resource type and which returns the Resource Handle of the new resource. In order to take part in Order Processing the new resource must support Order Processing as defined in section "Resources in the Context of Order Processing".

Section "Order Processing Container" describes the interaction of the Container with the Factory Registry for instantiating new resources.

This section summarizes the interface of the Factory Registry.

We define a resource factory as a resource that provides an operation create which creates a new resource instance of a fixed resource type each time when being called. The create operation has no arguments and returns the Resource Handle to the new resource instance that has been created. This can be compared to a simplified view of factories in real life: assume we have a set of car factories where each factory can only produce one model. Compared to this picture the Factory Registry is a list of car factories where each entry contains the location information of the factory and the related model that the factory produces. For ordering a new model X car we query the Factory Registry in order to find out which factory produces this model, go this factory, and finally request the assembly (or "creation") of a new model X car. If the company decides to add new or remove old car models then the list of factories is updated accordingly. The company could also decide to move production of an existing model to a different factory. This situation can also be handled by simply updating of the factory list.

The Factory Registry provides following operations:

registerFactory(resourceType, factoryHandle)
Adds a new Resource Handle factoryHandle that points to a resource factory to its internal storage together with the associated resource type resourceType.

deRegisterFactory(resourceType) Removes the resource factory for resource type resourceType from its internal storage.

getFactoryForResourceType(resourceType): ResourceHandle This section summarizes the interface of the Factory Registry.

Order Processing Container

The Order Processing Container (in short, "Container") is part of the Order Processing Environment and drives Order Processing. Order Processing starts when the Container is called by its asynchronous operation startOrder It is outside of the scope of this invention how Orders are generated and which system calls the startOrder operation. The startOrder operation has two parameters: the Order and the Resource Handle that points to the first resource in the Resource Topology where Order Processing is to be started. Order Processing always assumes an existing resource acting as an Order Processing Component as the starting point. This resource might be created by earlier Orders or it is created by an external system.

In order to simplify the description of the Container actions, following terms and background information are used:

1. Term: "Container connects resource Y to resource X according to the current topology subsection entry", meaning: the Container adds a new relation as specified by the relation attributes of the topology subsection entry to the Relationship Registry by calling its addRelationship operation. The new relation connects resources X and Y where resource Y is the target resource of the relationship. Topology subsections are described in section "Structure and Semantics of Orders".

2. Term: "Container removes resource X from Resource Topology", meaning: the Container calls operation removeRelationships of the Relationship Registry with a Resource Handle that points to resource X in order to remove all relationships with resource X. Then the destroy operation of resource x is called by the Container.
3. Term: "Container instantiates a new resource of resource type T", meaning: the Container queries the Factory Registry for a Resource Handle that points to the resource factory for resource type T by calling the operation getFactoryForResourceType of the Factory Registry. Then the Container calls the create operation of this factory. The create operation creates a new resource instance of resource type T and returns a Resource Handle that points to the new resource.
4. Term: "Container traverses to the next Order Processing Component", meaning: based on a "current" resource X the Container searches for the next resource with role Order Processing Component in the Resource Topology by querying the Relationship Registry with a call findRelatedTargetsByRole and passing a Resource Handle that points to resource X as startHandle parameter for the search and passing role "OrderProcessingComponent" as targetRole parameter. The Relationship Registry responds with an array of Resource Handles that reflects the search result. If exactly one resource is found then the Container treats this resource from now on as "current" resource. Finding no resources is a valid result and is treated by the Container as described in the explanation of the Order Processing loop in the text below. In order to simplify the description of the Container actions it is assumed that if there is more than one resource found then the Resource Topology is treated as being built up incorrectly (see also section "Extension of the Order Processing Environment" for dealing with these situations correctly) and the Container would stop Order Processing. Error handling is not part of this invention and is not discussed any further.
5. Term: "Container traverses to the next Order Handling Component", meaning: like point 4 above but using target role "OrderHandlingComponent" instead of using target role "OrderProcessingComponent".

FIGS. 5 to 8 depict the flow charts of the Container actions during Order Processing. Order Processing is started by calling the startOrder operation of the Container with two parameters: the Order that is to be processed and the Resource Handle that points to the first resource in shows the Request Path and depict the flow charts of subroutine CreateOHCChain and CreatNextOPC, repectively.

Comments to FIG. 5: The flow chart starting point correlates to the call of the startOrder operation of the Container. The Container calls the asynchronous operation processOrder of the current resource (as defined by the Resource Handle parameter of the startOrder operation). The resource in turn processes the Order as described in section "Resources in the Context of Order Processing" and finally hands over the (updated) Order back to the Container again by calling its asynchronous operation delegateOrder. This is not depicted in the flow chart—we treat the situation in the flow chart as if processOrder would be a synchronous call that finally returns the (updated) Order. The Container saves the Resource Handle of the current resource now to its variable handleOfLastOPC and then calls the subroutine CreateOHC chain. This subroutine creates and adds all Order Handling Components to the Order Handling Component chain of the current resource. Then the Container traverses to all available Order Handling Components in the Order Handling Component chain and calls their processOrder operations subsequently in the sequence that is given by the Order Handling Component chain. In the next step the Container restores the Resource Handle of the last Order Processing Component that the Container has called before traversing the Order Handling Component chain and treats this resource as the "current" resource. The Container now calls the current resource a second time by its processOrder operation. When finished the Container calls the subroutine CreateNextOPC which connects the next Order Processing Component to the current resource if the Container can find an entry for it in the topology subsection of the current resource and traverses to that resource it has found. Otherwise, if the Container cannot find another Order Processing Component in the topology subsection, the Request Path is terminated. In addition to the described actions, the Container stores the Resource Handle of each called resource into its internal stack. This stack is used during the Response Path for traversing thought all resources the Container has called before in reverse order.

Comments to FIG. 6: this flow chart depicts the Container actions for processing the Response Path of Order Processing. The Container queries its internal stack for traversing through all resources the Container has called before in reverse order. In each iteration of the loop the topmost stack entry is read and removed from the stack. The stack contains the Resource Handles of all the resources that have been called in the Request Path. The fact that each Order Processing Component has been called twice during the Request Path is reflected accordingly by two stack entries for Order Handling Components (one before and the other after the entries for the Resource Handles of the resources of the Order Handling Component chain)

Comments to FIG. 7: This flow chart depicts the actions of subroutine CreateOHCChain for building up the Order Handling Component chain for the current resource which is always an Order Processing Component. The Container instantiates and then connects the Order Handling Components to the last Order Handling Component in the chain (or directly to the current resource at the beginning) according to the entries in the topology subsection of the current resource.

Comments to FIG. 8: This flow chart depicts the actions of subroutine CreateNextOPC. The Container reads the topology section of the current resource which is always an Order Processing Component. It the Container finds on entry for a new Order Processing Component then the Container instantiates the Order Processing Component according to the topology subsection entry for that component and connects it to the current resource. At the end of the Request Path the Container will not find a next Order Processing Component in the topology section of the current resource anymore.

Extension of the Order Processing Environment

In order to keep the description of the Order Processing Environment simple we made the restriction that branching points in the Resource Topology where more than one Order Processing Component is connected to another Order Processing Component are not allowed. This is an unacceptable restriction for real applications which is resolved in this section.

In order to allow for the mentioned branching points, the delegateOrder operation of the Container is enhanced by an additional parameter targetOPCHandle which is set by the resource that calls the operation and which determines the next resource to be called by the Container for Order Processing. In that manner, a resource can determine where to go next at a branching point. Only resources that are Order Processing Components are allowed to redirect Order Processing to other Order Processing Components in this way. If the new parameter targetOPCHandle is left empty, then delegateOrder acts as before.

Furthermore, the Container functionality is enhanced in the following way: if the Order Processing is already processing the Response Path, then a call of delegateOrder with a defined Resource Handle for targetOPCHandle instructs the Container to switch back to the Request Path traversal mode again and to traverse the new path starting with the resource where targetOPCHandle points to. In this manner, Order Processing can traverse through multiple sub-paths starting from a branching point.

Additionally, Order Processing can also "jump" from one resource to another (even if they are not related in the Resource Topology) since targetOPCHandle can be any Order Handling Component in the Resource Topology.

Section 2

The following section describes the invention for which patent protection is sought.

This invention embraces various functional components. Each of those functionalities is provided by certain components as depicted in FIG. 10.

The following sections give a detailed description of each of these components, namely the Resource Topology Interpreter, the Static Workflow Builder, the Transformation Manager and the Deployment Manager embraced by the present invention.

As depicted in FIG. 10 the Transformation Manager is the entry point for the overall transformation process. Therefore, a client wanting to trigger the transformation of an order into a standards-based workflow definition must provide the order document and the information about the current resource topology as input for the Transformation Manager (step 1, see FIG. 9).

Once the Transformation Manager has received that input, it first passes it along to the Resource Topology Interpreter (step 2), which then performs the actual transformation process in collaboration with the Static Workflow Builder (step 3) The details of this transformation process are described precisely in the section "Static Workflow Builder and the Resource Topology Interpreter". Once the workflow generation process is completed, the workflow is then returned to the Transformation Manager (step 4). In order to be able to actually run the generated workflow, it must be deployed in a corresponding workflow engine. So the Transformation Manager passes the generated workflow definition to the Deployment Manager (step 5) and the Deployment Manager deploys this workflow definition into the appropriate runtime environment (step 6), which makes it possible to execute the semantics of the order as a standard workflow.

Transformation Manager

Transformation Manager has the responsibility for coordinating the overall transformation process. It acts as the entry point for starting the transformation process, i.e. each time a new transformation shall be started only the Transformation Manager has to be called. The Transformation Manager requires the order document to be transformed as input. Furthermore, it requires information about the resource topology, on which the order document will be processed as input. The current invention is independent of the representation format of this resource topology. An example implementation could for example be some XML format describing all resources of the resource topology and the relationships existing between them. This leads to the description of the actual data, which is required within the resource topology information: In accordance what is defined in the "Relations between Resources" section the handles for all resources are required and in terms of the relationships described as part of the resource topology information there is also the sourceHandle, the targetHandle, the sourceRole, the targetRole and the relationName required in order to represent the relationships between the resources appropriately.

Static Workflow Builder and the Resource Topology Interpreter

The Static Workflow Builder and the Resource Topology Interpreter are main parts of the present invention. The Static Workflow Builder is responsible for creating the static workflow in form of a sequence of activities depending on information from the Resource Topology and the Order document. The Resource Topology Interpreter is responsible for interpreting the incoming resource topology which is an in memory representation of the resource model. This interpretation must be performed in such a way that the underlying resource tree is traversed as defined in the previous chapter. Additionally, the Resource Topology Interpreter updates the in-memory resource topology according to the each interpretation step. Overall, the goal of this invention is to propose an approach for realizing the functionality of the Order Processing Container with standards-based workflow technology.

The following description shows the algorithm how the sequence of activities of the static workflow is built during transformation step and how these two components, Static Workflow Builder and Resource Topology Interpreter, interact. This description corresponds to FIG. 11.

Before starting the step-by-step description of the transformation process, the assumptions are depicted next. One assumption is—as already said before—that the transformation process will get two inputs: The order and the in memory representation of the current Resource Topology. The in-memory representation of the resource topology could for example be rendered in some XML format. The specifics of such a format are not in the scope of this invention. The information about the resource topology itself must be determined by client initiating the transformation process. Therefore, the client retrieves information about the relevant resources and relationships between those resources by querying the Relationship Registry.

A further assumption is that the subscription already exists before the transformation described here starts (for example, it could have been created by a client calling the subscription factory). The subscription is always the top resource of the in-memory Resource Topology and is therefore normally used as entry point for order processing.

In step 1 the Resource Topology Interpreter has to find the first resource node to visit in the Resource Topology based on the incoming in-memory representation of the resource topology. Based on the above assumption the subscription will be the first node which is found by the Resource Topology Interpreter. In the case of an initial order which triggers the initial creation of a set of resources, only the subscription node is found as the only resource being part of the resource topology. The Resource Topology Interpreter will pass the information about this resource to the Static Workflow Builder.

In step 2 the Static Workflow Builder uses the information about the passed in resource to search the corresponding section in the order (document). If this resource section can be found, the flow proceeds with step 3 next. If no corresponding resource section exists step 5 is executed directly.

In step 3 the newly found resource section in Order Document is scanned if additional resources should be created related to the current resource. There are so-called Topology subsections within each resource section of the Order Document. These sections control the creation of resources and relationships to them. So if additional resources should be created based on the information defined within the Topology section, then the Static Workflow Builder adds activities for creation of resources in the static workflow, i.e. for each resource to be created an activity is added, which triggers the creation of the resource by executing a call to the Create operation of the corresponding resource factory. If no creation of resources is necessary then step 5 is executed directly.

In step 4 the newly created resources are added to the in-memory representation of Resource Topology by the Resource Topology Interpreter, so that this in-memory resource topology always represents the current status of the resource topology, as if the order would have been processed in reality. The Resource Topology needs to be updated to determine which resource needs to be visited next in Resource Topology as it is required in step 7.

In step 5 the Static Workflow Builder adds one activity to the static workflow which invokes the process order operation of the resource found in step 1 and step 7 respectively. The order document contains more information which needs to be processed by this process order operation.

In step 6 the Static Workflow Builder adds one additional activity to the response path which invokes the process order operation again of the resource found in step 1 and step 7 respectively. For that the resource handle information being part of the resource topology information is used. This has to be done since each resource has to be visited on the request phase and the response phase. In the response phase, the order document is processed and updated by the resources in the reverse order of the request path.

In step 7 the Resource Topology Interpreter has to find next resource to visit in the updated in memory representation of Resource Topology. Which resource is next to visit is determined by specific relation types between resources like "delegates", "uses" and "chains". If a resource is found then step 2 is performed again until all resources are visited found in in-memory representation of the Resource Topology. If no resource is found the static workflow is created successfully and can be passed to the next component.

Deployment Manager

Once the workflow definition consisting of a set of activities was generated by the Static workflow Builder in combination with the Resource Topology Interpreter the workflow definition must be deployed into its runtime for being able to actually execute this workflow definition. In order to achieve that, the Transformation Manager passes the workflow definition returned from the Transformation process to the Deployment Manager. The Deployment Manager encapsulates the knowledge about what has to be done in order to bring workflow definitions into their corresponding process engine (this term is equivalent with the term workflow engine). The Deployment Manager communicates with the process engine, deploys the workflow definition into it and consequently makes it available to the outside world, so that it can be executed.

workflow engines as used by the present invention are commercially available workflow engines which are based on standard workflow description languages, e.g. bpel, fdml.

| Glossary | |
|---|---|
| IT Service Environment | collection of resources and a set of behaviour conditions that altogether define a specific IT service |
| IT Service | A service in the context of information technology, e.g. providing an ERP system to an external customer |
| Systems Management Task | A logical and/or functional unit that performs some action in the context of underlying IT Service Environments. System Management Tasks may refer to one or more resource management functions. |
| Task | Short form for Systems management task |
| Systems Management Flow Order | A sequence of Tasks. The Order is a document (e.g., XML) which includes a number of tasks for each involved resource without arranging those tasks in a sequence. This differentiates Orders from workflow descriptions used by standard workflow engines. |
| OrderID | A unique ID that is assigned to an instance of an Order when being processed. |
| Order Document | A document (preferably in XML) that represents an order instance |
| Order Document Section | One section within the Order Document containing information for one specific Task. During Order Processing (see below) the respective Task reads its required input data from its section in the Order Document and writes back response data to this section. |
| Order Processing | The processing of an Order Document by the Container and Tasks. During processing the Order Document is passed from resource to resource; during transitions between two consecutive resources in the Systems Management Flow the Order Document is passed to the Container. |
| Systems Management Flow Execution Container | An environment for executing Systems Management Flows based on the resource topology, on the information in the Order Document, and on the responses of the involved resources. |
| Container | Short form for Order Processing Container |
| Resource Topology | A set of resource instances and relations between these resource instances with the primary purpose of reflecting the underlying instantiated IT Service Environment. |
| Resource Handle | A pointer to a resource - either a direct reference to a resource or an indirect reference to a resource that must be resolved into a direct reference (the notion of direct and indirect references is, for example, mentioned in the Global Grid Forum Open Grid Service Infrastructure (OGSI) —direct references are called Grid Service References (GSR), and indirect references are named Grid Service Handles (GSH)). Another example for direct references are End Point References as defined in the WS-Addressing standard. |

What is claimed is:

1. A computer-implemented method for transforming orders for executing them in standard workflow engines, wherein said orders are being created for an order processing environment, wherein said order processing environment includes at least an order processing container, relationship registry that stores relationships between resources, and an order which is being processed by said order processing container, wherein said order includes a number of resource-specific tasks without arranging those in a sequence and, wherein said tasks provide actions for creating and/or modifying resource topologies, wherein said each task is assigned at least input parameters for execution of said task and optionally topology information which describes a new set of relationships and resources that are to be created or deleted, wherein said method is executed in order transformation environment which includes a transformation manager, a resource topology interpreter, static workflow builder, and a deployment manager, said method comprising the steps of:
- a) providing an order to be transformed as an input parameter to said transformation manager, which is the entry point for transforming the orders into a standards-based workflow definition, wherein said order is a number of tasks for each involved resource;
- b) providing a representation of the resource topology corresponding to said order to be transformed as an input parameter to said transformation manager, wherein said representation of said resource topology has been created by starting a build-up process of said representation of said resource topology with the resource being used as an entry point for the order processing, and identifying all resources being either directly or indirectly related to said entry point resource by querying said relationship registry and adding them to an already-exiting representation of a resource topology which is represented by said entry point resource;
- c) delegating said input parameters to said resource topology interpreter, which generates the workflow in a form of a sequence of activities, and which interprets an incoming resource topology that is an in-memory representation of the resource model;
- d) transforming said order by said resource topology interpreter in interaction with said static workflow builder, which generates a static workflow in the form of a sequence of activities related to information from the resource topology and an order document, by using said representation of said resource topology which comprises the steps of:
  - d 1) identifying a first resource node in said representation of said resource topology,
  - d 2) providing said resource node to static workflow builder,
  - d 3) searching in said order for a task section corresponding to said resource node, if not available continue with step d 7,
  - d 4) searching for a topology section in said section, if not available continue with step d 7,
  - d 5) adding activities to workflow to be generated based on said topology section, wherein for each resource to be created as a part of said topology section two activities are to be added to said workflow to be generated, wherein said first activity invokes a resource factory for the resource type as specified in said topology section, and wherein said second activity invokes said relationship registry for adding a new relationship between the current and the newly created resource, wherein the resource factory provides a create operation without parameters which instantiates a new resource instance for the given resource type and which returns a resource Handle of the new resource, and wherein the relationship registry responds with an array of resource handles that reflects the search result,
  - d 6) updating said representation of said resource topology based on said topology section,
  - d 7) adding activity to workflow to be generated for invocation of process order operation of said resource node,
  - d 8) adding activity to workflow to be generated for invocation of process order operation on response path of order processing,
  - d 9) identifying next resource node in said representation of said resource topology and repeating steps d 2 to d 9 for said next resource node, and
- e) providing said generated workflow to a workflow engine,
  wherein the workflow interprets the resource topology and the static workflow is generated from the sequence of activities related to information from the resource topology, the resource topology linking the workflow and the static workflow.

2. A method according to claim 1, wherein said generated workflow is provided to said workflow engine by the steps of:
- e 1) returning said generated workflow to said transformation manager,
- e 2) passing said generated workflow to said deployment manager, which encapsulates information related to incorporating workflow definitions into a corresponding process engine, and
- e 3) deploying said generated workflow by the said deployment manager to workflow engine.

3. A method according to claim 1, in the case a next resource according to step d 9 cannot be found the transformation process stops.

4. A computer program product stored on computer usable medium comprising readable program means for causing a computer to perform the method of claim 1, when said computer program is executed on a computer.

5. A system for transforming orders for executing them in standard workflow engines, wherein said orders are being created for an order processing environment, wherein said order processing environment includes a processor having at least an order processing container, relationship registry, and an order which is being processed by said order processing container, wherein said order includes a number of resource-specific tasks without arranging those in a sequence and, wherein said tasks provide actions for creating and/or modifying resource topologies, wherein said each task is assigned at least input parameters for execution of said task and optionally topology information which describes a new set of relationships and resources that are to be created or deleted, wherein said system includes at least a transformation manager, a resource topology interpreter, static workflow builder, and a deployment manager, wherein said system further comprises:
- a) means for providing an order to be transformed as an input parameter to said transformation manager, which is the entry point for transforming the orders into a standards-based workflow definition, wherein said order is a number of tasks for each involved resource;
- b) means for providing a representation of the resource topology corresponding to said order to be transformed as an input parameter to said transformation manager, wherein said representation of said resource topology has been created by starting a build-up process of said representation of said resource topology with the resource being used as an entry point for the order processing and identifying all resources being either directly or indirectly related to said entry point resource by querying said relationship registry and adding them to an already-existing representation of a resource topology which is represented by said entry point resource;
- c) means for delegating said input parameters to said resource topology interpreter, which generates the workflow in a form of a sequence of activities, and which interprets an incoming resource topology that is an in-memory representation of the resource model;

d) means for transforming said order by said resource topology interpreter in interaction with said static workflow builder, which generates a static workflow in the form of a sequence of activities related to information from the resource topology and an order document, by using said representation of said resource topology which comprises the means of:

d 1) means for identifying a first resource node in said representation of said resource topology, d 2) means for providing said resource node to static workflow builder, d 3) means for searching in said order for a task section corresponding to said resource node, if not available continue with step d 7, d 4) means for searching for a topology section in said section, if not available continue with step d 7, d 5) means for adding activities to workflow to be generated based on said topology section, wherein for each resource to be created as a part of said topology section two activities are to be added to said workflow to be generated, wherein said first activity invokes a resource factory for the resource type as specified in said topology section, and wherein said second activity invokes said relationship registry for adding a new relationship between the current and the newly created resource, wherein the resource factory provides a create operation without parameters which instantiates a new resource instance for the given resource type and which returns a resource Handle of the new resource, and wherein the relationship registry responds with an array of resource handles that reflects the search result, d 6) means for updating said representation of said resource topology based on said topology section, d 7) means for adding activity to workflow to be generated for invocation of process order operation of said resource node, d 8) means for adding activity to workflow to be generated for invocation of process order operation on response path of order processing, d 9) means for identifying next resource node in said representation of said resource topology and repeating steps d 2 to d 9 for said next resource node, and e) means for providing said generated workflow to a workflow engine, wherein the workflow interprets the resource topology and the static workflow is generated from the sequence of activities related to information from the resource topology, the resource topology linking the workflow and the static workflow.

6. A system according to claim 5, wherein said generated workflow is provided to said workflow engine by:

e 1) means for returning said generated workflow to said transformation manager, e 2) means for passing said generated workflow to said deployment manager, which encapsulates information related to incorporating workflow definitions into a corresponding process engine, and e 3) means for deploying said generated workflow by the said deployment manager to workflow engine.

* * * * *